US008554465B2

(12) United States Patent
Schoenherr et al.

(10) Patent No.: US 8,554,465 B2
(45) Date of Patent: Oct. 8, 2013

(54) DEVICE AND METHOD FOR THE SUPPORTED PARKING OF A VEHICLE

(75) Inventors: Michael Schoenherr, Renningen-Malmsheim (DE); Christian Pampus, Leonberg (DE); Volker Niemz, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/383,838

(22) PCT Filed: May 25, 2010

(86) PCT No.: PCT/EP2010/057109
§ 371 (c)(1),
(2), (4) Date: Mar. 30, 2012

(87) PCT Pub. No.: WO2011/006705
PCT Pub. Date: Jan. 20, 2011

(65) Prior Publication Data
US 2012/0191337 A1    Jul. 26, 2012

(30) Foreign Application Priority Data
Jul. 13, 2009 (DE) .................. 10 2009 027 650

(51) Int. Cl.
*G06F 17/00* (2006.01)
*G01C 21/00* (2006.01)
*G05D 1/0246* (2006.01)
*G05D 1/0272* (2006.01)
*G08G 1/14* (2006.01)

(52) U.S. Cl.
USPC ............... 701/400; 701/300; 701/28; 701/26; 340/932.2

(58) Field of Classification Search
USPC ........................... 701/28, 400, 26; 340/932.2
See application file for complete search history.

(56) References Cited

U.S. PATENT DOCUMENTS

| | | | |
|---|---|---|---|
| 7,366,595 B1 * | 4/2008 | Shimizu et al. | 701/301 |
| 2006/0190147 A1 * | 8/2006 | Lee et al. | 701/26 |
| 2008/0211644 A1 | 9/2008 | Buckley et al. | |
| 2008/0269973 A1 * | 10/2008 | Kuroda | 701/26 |
| 2010/0039292 A1 * | 2/2010 | Scherl et al. | 340/932.2 |
| 2010/0283634 A1 * | 11/2010 | Krautter et al. | 340/932.2 |

FOREIGN PATENT DOCUMENTS

| | | |
|---|---|---|
| DE | 102 41 464 A1 | 3/2004 |
| DE | 10 2005 015 396 A1 | 12/2005 |
| DE | 10 2005 032 095 A1 | 1/2007 |
| DE | 10 2005 037 468 A1 | 2/2007 |
| DE | 10 2006 004 866 A1 | 8/2007 |
| DE | 10 2008 001 363 A1 | 10/2008 |
| JP | 2002 154396 A | 5/2002 |
| WO | 2007/031379 A1 | 3/2007 |

* cited by examiner

OTHER PUBLICATIONS

International Search Report corresponding to PCT Application No. PCT/EP2010/057109, mailed Oct. 28, 2010 (German and English language document) (7 pages).

*Primary Examiner* — Fadey Jabr
*Assistant Examiner* — Yazan A Soofi
(74) *Attorney, Agent, or Firm* — Maginot, Moore & Beck

(57) ABSTRACT

A device for the supported parking of a vehicle in a parking space is disclosed. The device includes at least one sensor device allowing the detection of at least one object at a near range from the vehicle. The device is implemented for numerically determining the presence of at least one object at a far range from the vehicle, such that the numerical determining of the object in the far range takes place on the basis of the object detected in the near range.

11 Claims, 3 Drawing Sheets

DEVICE AND METHOD FOR THE SUPPORTED PARKING OF A VEHICLE

This application is a 35 U.S.C. §371 National Stage Application of PCT/EP2010/057109, filed on May 25, 2010, which claims the benefit of priority to Serial No. DE 10 2009 027 650.5, filed on Jul. 13, 2009 in Germany, the disclosures of which are incorporated herein by reference in their entirety.

The present disclosure relates to a device and a method for the assisted parking of a vehicle in a parking space, having at least one sensor device with which detection of at least one object in the close range of the vehicle is made possible.

DE 10 2005 037 468 A1 discloses a device for the assisted parking of a vehicle in a parking space according to the present generic type. The parking space relates to a parking space which is arranged transversely with respect to the vehicle, wherein the sensor device is embodied as a parking space measuring device. If the vehicle is moved past the parking space at a preferably low speed, the sensor device, in the form of a radar, an ultrasonic sensor or a LIDAR sensor, can scan the geometric configuration of the parking space. If the vehicle stops, the device can determine movement paths on the basis of the measurement data relating to the parking space, in order to park the vehicle in the parking space. The movement paths determined by the device are embodied in such a way that the vehicle can be moved as easily as possible into the parking space. For this purpose, either the movement path is displayed to the driver or the device intervenes actively in the control of the vehicle in order to park it automatically in the parking space.

While the vehicle is driving past the parking space, at least partial geometric measurement of the parking space is performed. During this measurement it is possible, if appropriate, that the entire geometry of the parking space is not detected, with the result that missing regions which are not covered, in particular rear regions of the parking space, are filled in by the sensor device by means of stored typical parking space patterns. Possible movement paths for steering the vehicle into the parking space are determined on the basis of the measurement of the parking space and by taking into account fixed vehicle geometry data which are predefined by the actual vehicle which is to be parked.

However, a disadvantage of such a device is that the sensor device has a limited sensor range and missing regions which cannot be covered and which are also outside the parking space cannot be made available to the device as input data. If the vehicle is not driven on past the parking space, the sensor device can only evaluate the close range which describes the direct region around the vehicle and which is covered by the sensor device. If the device then makes available movement paths which go beyond the close range, a situation may occur in which the device predefines a movement path which can lead to a collision of the vehicle with objects which have not been detected by the system.

SUMMARY

The objective of the present disclosure is to provide a device for the assisted parking of a vehicle in a parking space, which device avoids a possible collision of the vehicle with objects which have not been detected.

This objective is achieved on the basis of a device for the assisted parking of a vehicle in a parking space as set forth below and a method for this purpose also set forth below. Advantageous developments of the device and method are also set forth below.

The disclosure includes the technical teaching that the device is designed to perform numerical determination of the presence of at least one object in the long range of the vehicle, such that the numerical determination of the object in the long range is carried out on the basis of a detected object in the close range.

A parking space is frequently linked to recurring ambient situations in road traffic. If the driver of a vehicle detects a parking space and if the driver drives the vehicle slowly past the parking space in such a way that the sensor device can measure the parking space, the parking space is frequently bounded by other vehicles or structural surroundings. If the sensor device detects objects in the close range of the vehicle, it can be assumed with probability that the objects either repeat within a long range or extend continuously into the long range, this relating, for example, to structural surroundings such as a wall, a curb, a roadway boundary or the like.

If no corresponding object is detected within the close range, it can be assumed that there is no corresponding object located in the long range. However, if the sensor device detects at least one object which also still has a certain position within the close range, it is proposed according to the disclosure to transmit an image from the close range into the long range by means of the device by assuming that the objects which are detected in the close range repeat in the long range or extend into the latter. Consequently, not only is it possible for the assistance of the parking of the vehicle in the parking space to be carried out on the basis of the detected objects within the close range, the device can also assist the parking process by taking into account assumed objects in the long range.

The close range is determined by the region within which objects can be detected with the sensor device, and wherein the long range relates to the region around, and in particular in front of, the vehicle in the direction of travel, which region lies outside the range of the sensor device. In particular when the driver merely drives the vehicle past the parking space to such an extent that the objects within the close range are detected, the sensor device cannot scan the region in front of the vehicle. The numerical determination of objects in front of the vehicle is therefore of particular importance since this region, in this case the long range, is, under certain circumstances, required for the assisted parking of the vehicle in the parking space and is traveled through by the vehicle.

The parking space may be present on one side of the direction of movement of the vehicle, wherein the parking space can either relate to a longitudinal parking space, a diagonal parking space or a transverse parking space. In this context, it is possible to provide that the detected object and the assumed object are present on the side of the direction of movement of the motor vehicle lying opposite the parking space. If the parking space is located, for example, on the right-hand side of the direction of movement of the vehicle, the sensor device can be embodied in such a way that not only the right-side region of the motor vehicle but also the left-side region lying opposite is scanned. Consequently, the detected objects and the assumed objects can be located on the side of the direction of movement of the vehicle lying opposite the parking space. The objects can be, for example, parked vehicles and/or structural installations. If, for example, the vehicle drives slowly past parking space which is located on the right-hand side of the direction of movement of the vehicle, the close range on the left-hand side of the vehicle, for example on the side of the road lying opposite, is scanned at the same time. If the sensor device detects objects on the left-hand side of the direction of movement of the vehicle, these objects form a basis for determining the long range in that it is assumed that objects on the side lying opposite the parking space are located not only in the close range but also in the long range. As a result, the device can form the maneuvers for parking in such a way that a collision of the vehicle with the detected objects in the close range as well as with assumed objects in the long range is avoided.

In order to assist the parking of the vehicle in the parking space, the device can determine at least one movement path for parking the vehicle in the parking space and can specify said movement path to the driver of the vehicle. According to the disclosure there is then provision that the at least one movement path is determined or modified by the device in such a way that a collision of the vehicle with an assumed object in the long range is avoided. It is basically known to avoid a collision with detected objects in the close range. However, above and beyond this prior art the numerical determination of possible objects in the long range can serve to configure the movement paths solely on the basis of the assumption of objects in the long range in such a way that a collision of the vehicle with the assumed objects is avoided. The position and arrangement of the objects in the long range is assumed here on the basis of the position and arrangement of the object or objects in the close range. If, for example, a plurality of vehicles are parked one next to the other on the side of the roadway lying opposite the parking space and if the sensor device detects these vehicles by scanning the close range, the device can determine the long range by assuming that the row of vehicles continues from the close range into the long range. If, for example, a structural installation such as a wall, a roadway boundary or the like is located in the close range and if the sensor device detects this object, the device determines a long range by assuming that this structural installation extends into the long range. Consequently, the device will propose and/or implement movement paths which are determined in such a way that a collision of the vehicle with the objects both in the close range and in the long range is avoided.

Furthermore it is possible to provide that the device comprises a display means which is configured to display detected objects in the close range and assumed objects in the long range. The driver of the vehicle therefore receives information about detected objects which are assumed to be in the long range through numerical determination. In addition, the movement paths which are determined by the device for parking the vehicle in the parking space can be displayed on the display means. Consequently, the driver is provided with an overview of assumed objects in the long range which are displayed in conjunction with the determined movement paths.

Furthermore, the device can comprise an input means which the driver can use to confirm to the device the presence of assumed objects in the long range. In this context, the input means and the display means can be embodied together by means of a sensor screen in the region of the driver in the vehicle, which screen can serve both to display the movement paths and the objects in the close range and long range as well as serving as an input means. If the system assumes that objects which are determined numerically by objects which are present in the close range are present in the long range, the driver can drive the vehicle into the parking space along the movement paths which are determined on the basis of the objects which are present. However, these movement paths can turn out to be more complicated than movement paths without objects in the long range. If, despite the presence of objects in the close range, there are, however, no objects in the long range and if the driver can detect this, the absence of objects in the long range can be specified using the input means of the device. Consequently, the movement paths can be re-determined, said movement paths turning out, under certain circumstances, to be simpler than when there are objects present in the long range.

The present disclosure also relates to a method for the assisted parking of a vehicle in a parking space having at least the following steps: detection of an object in the close range of the vehicle with at least one sensor device, determination of the presence of at least one object in the long range of the vehicle, such that the determination of the object in the long range is performed numerically on the basis of a determined object in the close range. Furthermore, the device can determine at least one movement path for parking the vehicle in the parking space and specify said movement path to the driver of the vehicle. The determination of the movement path for parking the vehicle is performed here by the device on the basis of both specific objects in the close range and the assumed objects in the long range. As a result, the at least one movement path can be determined by the device in such a way that a collision of the vehicle with an assumed object in the long range is avoided.

BRIEF DESCRIPTION OF THE DRAWINGS

Further measures which improve features of the disclosure are presented in more detail below together with the description of a preferred exemplary embodiment of the disclosure with reference to the figures. In the drawing.

DETAILED DESCRIPTION

Figure 1:
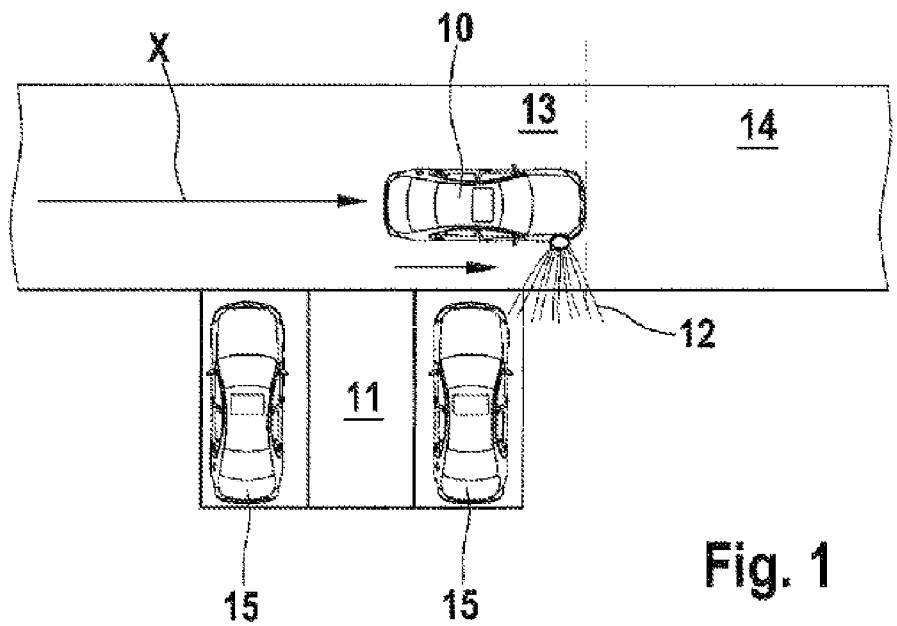
FIG. 1 shows a schematic view of a parking situation with a vehicle and a parking space.

FIG. 1 is a schematic view of a parking situation in a plan view explaining the detection of a parking space by a sensor device 12. A vehicle 10 is moved along a direction X of movement, wherein the movement can take place on a road so that parking spaces 11 are present in the lateral direction with respect to the road. The sensor device 12 is provided on the right-hand side of the vehicle 10. If the vehicle 10 is driven slowly past the objects 15, here parked cars, which bound the parking space 11, the sensor device 12 detects the parked cars 15. LIDAR technology or ultrasonic technology can also be used as the sensor device. The sensor device 12 is based on a radar or an infrared measuring device, so that the device detects objects which are present next to the vehicle. If the vehicle 10 is moved in the direction X of movement, the left-hand vehicle 15 is firstly detected, followed by the parking space 11. On the right-hand side, the parking space 11 is bounded by the other vehicle 15, which is subsequently detected by the sensor device 12. As a result, the device is provided with information about the presence of the parking space 11. After the right-hand vehicle 15 has been detected by the sensor device 12, the driver can stop the vehicle 10. However, as a result the sensor device 12 has only detected the close range 13, wherein objects cannot be detected in the long range 14 since the sensor device 12 is not moved into the long range 14.

Figure 2A:
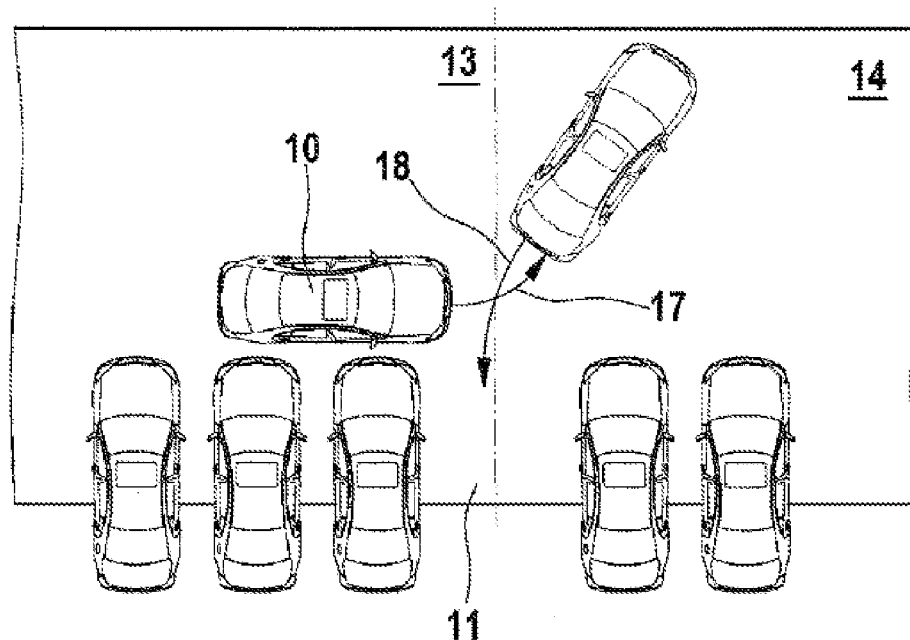
FIG. 2*a* shows a parking situation of a vehicle with a parking space, wherein a first movement path and a second movement path are specified, and wherein no objects are present in the close range or in the long range.
Figure 2B:
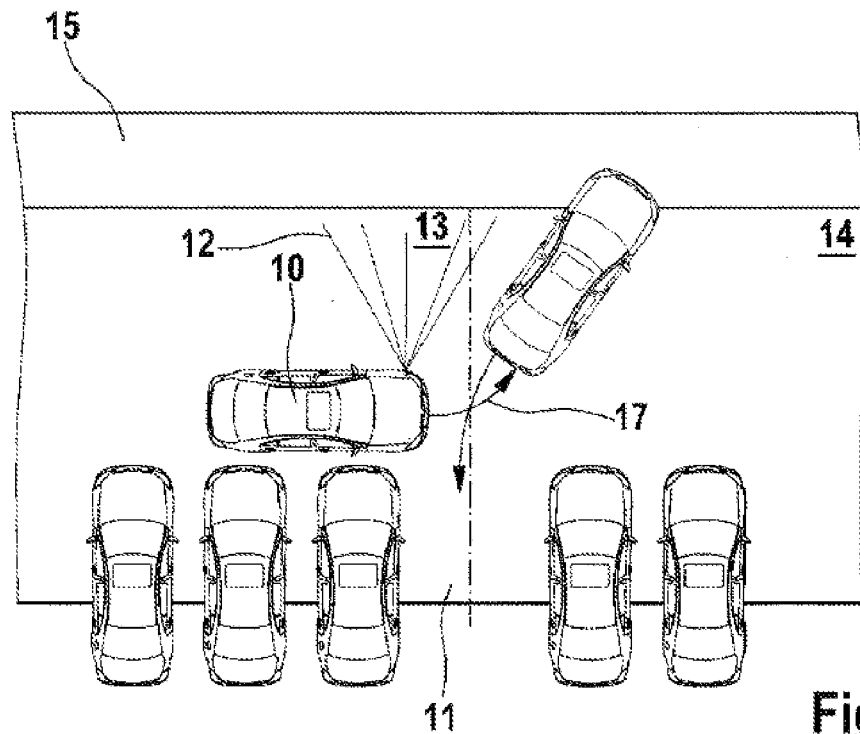
FIG. 2*b* shows a schematic view according to FIG. 2*a*, wherein an object is present in the close range and in the long range.

FIGS. 2a and 2b show a parking situation, wherein the vehicle 10 has already been driven past the parking space 11 and the device has determined movement paths 17 and 18 and specified them to the driver in order to park the vehicle 10 in the parking space 11. In FIG. 2a, there is no further object 15 located on the side opposite the parking space 11, while in FIG. 2b an object 15 is shown which is located both in the close range 13 and in the long range 14. If the vehicle 10 senses only the object 15 in the close range 13, according to the prior art the device cannot detect that the object 15 also continues into the long range 14. According to FIG. 2b, there will consequently be a collision of the vehicle 10 with the object 15 if the driver carries out the first movement path 17.

Figure 3:
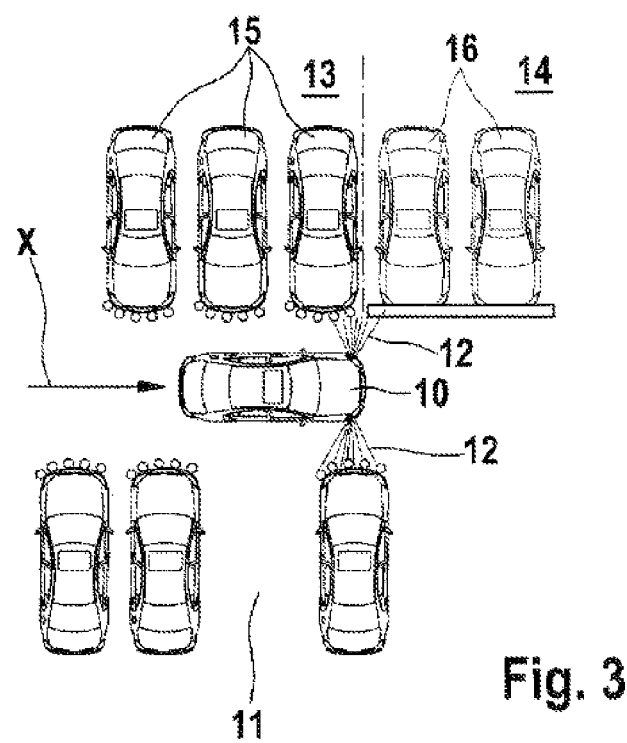
FIG. 3 shows a parking situation with a vehicle which is driven in a direction of movement, both past the parking space and past objects in the close range which are detected by a sensor device.

FIG. 3 shows a further example of a parking situation for parking a vehicle 10 in a parking space 11. The sensor device 12 is present both on the right-hand side of the vehicle and on the left-hand side of the vehicle. If the vehicle 10 is moved past the parking space 11 in the direction X of movement up to the position shown, the sensor device 12 can determine the presence of the parking space 11, wherein the sensor device 12 can also determine the objects 15 in the close range 13 on the side lying opposite the parking space. According to the disclosure, the device is designed to numerically determine the presence of at least one object 16 in the shown long range 14 of the vehicle 10 in such a way that the numerical determination of the objects 16 in the long range 14 takes place on the basis of the detected objects 15 in the close range 13.

Since the sensor device 12 detects the vehicles 15 on the left-hand side of the direction X of movement, the presence of the objects 16 is assumed through numerical determination without the sensor device 12 actively detecting the presence of the objects 16. The driver will not move the vehicle on beyond the parking space 11 since as a result other road users could assume that the driver does not wish to occupy the parking space 11. Consequently, the inventive numerical determination of the presence of the objects 16 by the sensor device 12 being moved past the objects 16 in the long range 14 without even a scanning process has the advantage that the driver does not have to move the vehicle 10 significantly beyond the parking space 11 in the direction X of movement. As a result, the device will propose movement paths 17 and 18 which are determined in such a way that a collision of the vehicle 10 with the objects 16 cannot occur in the long range 14, as is illustrated schematically in more detail in FIGS. 4a and 4b.

Figure 4A:
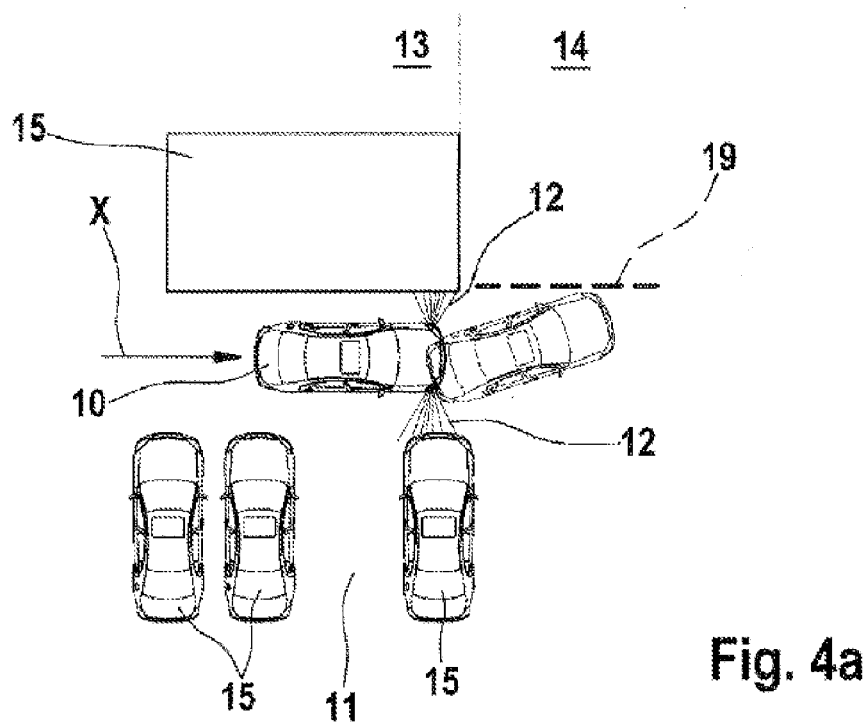
FIG. 4*a* shows a parking situation of a vehicle for parking in a parking space with an object which is present in the close range.
Figure 4B:
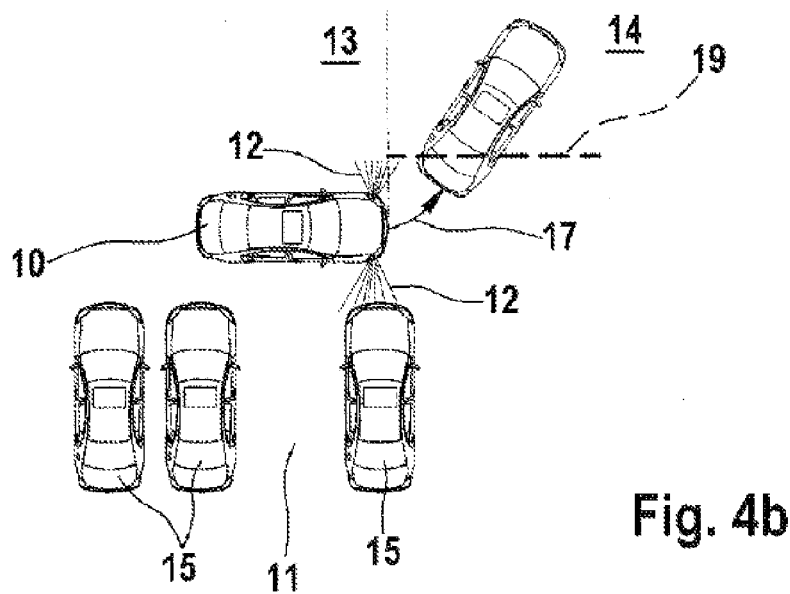
FIG. 4*b* shows the parking situation according to FIG. 4*a*, wherein the close range does not contain any object which is detected by the sensor device.

FIGS. 4a and 4b show in turn a parking situation for parking a vehicle 10 in a parking space 11. The vehicle 10 detects in FIG. 4a both vehicles 15 parked on the right-hand side and an object 15 on the left-hand side of the direction X of movement. Owing to the presence of an object 15 in the close range 13, the device determines an assumed obstacle boundary 19 since objects 16 are determined numerically in the long range 14 on the left-hand side of the direction X of movement by the device. However, the system determines the assumed obstacle boundary 19 even if objects 15 are not present in the long range 14, see the illustration in FIG. 4a. If the sensor device 12 detects, according to the illustration in FIG. 4b, no objects 15 on the left-hand side of the direction X of movement, the device proposes a first movement path 17 which goes beyond the assumed obstacle boundary 19, since on the basis of the given probability there is no object 16 present behind the obstacle boundary 19.

The present disclosure is not restricted in its embodiment to the preferred exemplary embodiment specified above. Instead, a number of variants are conceivable which make use of the illustrated solution even with embodiments which are of a basically different type. All of the features and/or advantages which result from the claims, the description or the drawings, including structural details, spatial arrangements and method steps, may be essential to the disclosure either per se or in a wide variety of combinations. For example, it may also be provided to represent the objects 16 in the long range 14 in a different color or in a flashing fashion on the display means. The method can also comprise an interrogation step in which the device interrogates the driver of the vehicle 10 via the display means to determine whether objects 16 are actually present in the long range 14.

Furthermore it is possible to provide that the sensor device 12 detects a certain object pattern on the left-hand side of the direction X of movement, which is the case, for example, when vehicles park at predefined intervals on road boundaries. Parking bays can also be interrupted regularly by structural installations, with the result that the surroundings detected in the close range 13 through the objects 15 are included in the calculation of the long range by the device. In particular it is to be noted that the specifications about the right-hand and left-hand sides of the direction X of movement can also be interchanged with one another. Consequently, the parking space 11 can also be located on the left-hand side of the direction X of movement of the vehicle 10, with the result that by virtue of the determination according to the disclosure the long range 14 and the objects 16 located therein can also be present on the right-hand side of the direction X of movement. A movement path 17 and 18, also referred to as a trajectory, can consequently be provided both for cutting in from the left and for cutting in from the right, wherein the parking space 11 does not necessarily have to relate to a transverse parking space but can also relate to a longitudinal parking space or a diagonal parking space.

The invention claimed is:

1. A device for the assisted parking of a vehicle in a parking space, comprising:
at least one sensor device configured to detect the presence of at least one object in a close range of the vehicle; and
a numerical processor configured to perform a numerical determination of the presence of at least one assumed object different from said at least one object and at a fixed assumed location in a region around the vehicle in the direction of travel of the vehicle that is outside said close range such that the numerical determination of the assumed object is carried out on the basis of the detected object in the close range.

2. The device as claimed in claim 1, wherein the parking space is present on one side of a direction of movement of the vehicle, and wherein the detected object and the assumed object are present on the side of the direction of movement of the vehicle lying opposite the parking space.

3. The device as claimed in claim 1, wherein the objects include one or more of a parked vehicles and a structural installation.

4. The device as claimed in claim 1, wherein at least one movement path for parking the vehicle in the parking space can be determined by the device and can be specified for the driver of the vehicle.

5. The device as claimed in claim 4, wherein the at least one movement path is determined by the device in such a way that a collision of the vehicle with an assumed object is avoided.

6. The device as claimed in claim 1, wherein the device comprises a display mechanism which is configured to display detected objects and assumed objects.

7. The device as claimed in claim 1, wherein the device comprises an input mechanism which the driver can use to confirm to the device the presence of assumed objects.

8. A method for the assisted parking of a vehicle in a parking space, comprising:
- detecting by at least one sensor device the presence of an object in a close range of the vehicle, and
- determining by a processor the presence of at least one assumed object different from said at least one object and at a fixed assumed location in a long range of the vehicle outside the range of the at least one sensor device,
- wherein the determining step is performed numerically on the basis of the detected object in the close range.

9. The method as claimed in claim 8, wherein at least one movement path for parking the vehicle in the parking space is determined by the device and is specified to the driver of the vehicle.

10. The method as claimed in claim 9, wherein the at least one movement path is determined by the device in such a way that a collision of the vehicle with an assumed object in the long range is avoided.

11. The method of claim 9, further comprising receiving an input from the driver confirming the presence of the assumed object prior to determining the movement path.

\* \* \* \* \*